United States Patent [19] [11] 4,199,638
McKee [45] Apr. 22, 1980

[54] COMPOSITION FOR WRITE-ON KEY TAG AND STICKER

[76] Inventor: Raymond J. McKee, P.O. Box 246, Wayne, N.J. 07470

[21] Appl. No.: 849,661

[22] Filed: Nov. 3, 1977

[51] Int. Cl.² .................... B32B 3/10; B32B 7/02
[52] U.S. Cl. .................... 428/131; 264/176 R; 264/177 R; 428/213; 428/218; 428/516; 428/910; 525/324
[58] Field of Search ........... 428/195, 910, 218, 516, 428/131, 213; 427/261; 260/897 A; 264/176 R, 177 R

[56] References Cited

U.S. PATENT DOCUMENTS

| 2,983,704 | 5/1961 | Roedel | 260/897 A |
|---|---|---|---|
| 3,088,848 | 5/1963 | Tritsch | 260/897 A |
| 3,183,283 | 5/1965 | Reding | 260/897 A |
| 3,231,636 | 1/1966 | Snyder et al. | 260/897 A |
| 3,372,149 | 3/1968 | Schaffhausen | 428/910 X |
| 3,853,595 | 12/1974 | Pedginski et al. | 428/156 |
| 4,007,298 | 2/1977 | Freehan et al. | 428/218 |
| 4,022,646 | 5/1977 | Casey | 428/218 X |

Primary Examiner—Thomas J. Herbert, Jr.
Attorney, Agent, or Firm—Clarence A. O'Brien; Harvey B. Jacobson

[57] ABSTRACT

An article of manufacture and a method of making same, the invention provides a sheet-like article formed of a mixture of high density and low density polyethylene, the ratio of high density to low density polyethylene being 3:1. The present article combines desired characteristics of flexibility, strength, inter alia and can be readily die cut and printed upon after extrusion from a melt.

4 Claims, No Drawings

COMPOSITION FOR WRITE-ON KEY TAG AND STICKER

BACKGROUND OF THE INVENTION

1. Field of the Invention

The invention relates generally to the field of thermoplastic materials, particularly articles of manufacture formed thereof and methods for making such thermoplastic articles.

2. Description of the Prior Art

Linear polyethylene has long been known to exist in high density and low density forms, each form having properties suited to certain uses. Mixtures of high density and low density polyethylene powder have previously been used as a surfacing for ferrous metal surfaces, the two materials being mixed and applied such as by spraying to a heated metal surface. U.S. Pat. No. 4,007,298 discloses such a coating formed of high density and low density polyethylene in a volumetric ratio of from 1:1 to 1:3. High and low density polyethylene have also previously been extruded in sheet form for varying purposes, sheets of high density polyethylene having a high tensile strength but a relatively low impact strength. In effect, high density polyethylene forms a stiff sheet-like article, such an article tending to crack and retain a crease when folded or bent in normal use. Further, sheet material formed of high density polyethylene is difficult to die cut and print with uniform pressure due to the fact that such sheet material has a natural "curl" which prevents ready maintenance of the sheet material in a flat conformation. Sheet material formed of low density polyethylene has a low tensile strength and is too flexible for applications which subject the material to heavy use. The present invention provides a sheet-like article of manufacture and a method for making such an article, the article comprising a mixture of high density and low density polyethylene which can be extruded in sheet form to provide a material having a desired flexibility and tear strength and which can be printed or written upon with ease compared to prior art polyethylene sheet materials.

SUMMARY OF THE INVENTION

The present invention provides an article of manufacture comprising sheet material formed of an extruded mixture of high density and low density polyethylene, the ratio by volume being 3:1 of high density to low density polyethylene. The present article of manufacture is particularly useful in the manufacture of tags, such as are used to hold keys, and window stickers which are coated over at least a portion of one surface thereof with an adhesive material and disposed against a window, such as the window of a car. The invention further provides a method for making such plastic articles comprising the extrusion of a mixture of 75% high density polyethylene and 25% low density polyethylene from a melt to produce a flat sheet stock which may be corona treated and embossed on the shiny side thereof, ink printing or writing preferably occurring on the dull side of the stock. The sheet stock formed of the particular mixture of high density and low density polyethylene of the invention provides a degree of flexibility and tear strength which is particularly suited to the formation of key tags and window stickers, the sheet stock being further suited to printing thereon to form an inexpensive article of manufacture having desired physical characteristics.

Accordingly, it is an object of the present invention to provide an article of manufacture comprised of a sheet-like stock material extruded from a mixture of high density and low density polyethylene from a melt containing said components in a volumetric ratio of 3:1.

It is a further object of the invention to provide an article of manufacture and a method of making same, the article of manufacture comprising a sheet material having desired flexibility and tensile strength and having at least one surface particularly receptive to printing with ink thereon, the article being formed of a mixture of 75% high density polyethylene and 25% low density polyethylene.

These together with other objects and advantages will become subsequently apparent as more fully hereinafter described and claimed.

DESCRIPTION OF THE PREFERRED EMBODIMENT

Extruded sheet stock of high density polyethylene has a dull side and a light-reflective side, such sheet stock typically having a tensile strength of approximately 4,000 psi and an impact strength of approximately 8 Ft-lb/in/notch. Low density polyethylene extruded from a melt at substantially the same temperature at which high density polyethylene is extruded has a lower specific gravity (0.915 as compared to 0.95) and a lower tensile strength of approximately 1,500 psi. The impact strength of low density polyethylene is typically about 10 Ft-lb/in/notch, the low density polyethylene material being substantially more flexible than the high density polyethylene sheet stock. Both polyethylene materials are high polymers of ethylene, having a molecular weight of approximately 6,000 or more. Typically, high and low density polyethylene is formed by the polymerization of ethylene either with peroxide catalyst or by metal alkyl catalysts in a hydrocarbon solvent. While these materials have previously been used to form articles of manufacture which are die cut from sheet stock material, such articles typically comprising key tags and window stickers on which it is desired to print with inks or the like, these materials have characteristic disadvantages which render their use in the formation of such articles less than desirable. For example, a key tag typically has a metal ring fitted in an aperture formed in the sheet stock material from which the key tag is formed. If the key tag is formed of low density polyethylene, the body of the key tag is sufficiently soft so that the metal ring will readily pull through the material in use. Further, the low density material is too flexible to form a key tag with the desired stiffness. On the other hand, high density polyethylene forms a key tag article which is too stiff and tends to crack when folded and creased. Sheet stock material formed of high density polyethylene also can be die cut only with great difficulty, printing on such a stock material with uniform pressure being essentially impossible due to the natural "curl" which is imparted to the relatively brittle high density stock material on extrusion thereof.

When forming window stickers with high density and low density polyethylene, similar problems occur. Sheet stock of low density polyethylene having an adhesive applied to at least a portion of one surface thereof will curl away from a window to which the adhesive portion is applied when subjected to heat, such as inside an automobile. Water condensing on the inside of an automobile window to which such an article has been applied can thereby run downwardly between the window sticker and the window, therefore rendering any printed matter on the sticker illegible from a location outside of the window. The relative softness of the low density polyethylene sheet stock material renders the adhesion of the sticker inadequate since the "pull-off" power is resisted by only a small portion of the adhesive at any given time. Formation of a window sticker with a high density polyethylene sheet stock material is impractical due to the strength of the inherent "curl" formed in the stock material on formation from a melt. A window sticker of high density polyethylene sheet stock material will simply not lie flat against a window surface.

The present invention provides a sheet stock material formed of a mixture of high density and low density polyethylene, the resulting article of manufacture being particularly useful for key tags and window stickers which are essentially formed by die cutting of a flat sheet stock extruded from a melt. The sheet stock material of the present invention is extruded from a melt comprised of a mixture of 75% high density polyethylene and 25% low density polyethylene by volume. The article of manufacture thus formed exhibits a desired flexibility and tensile strength which is particularly useful in the formation of key tags and window stickers, the present stock material being readily die cut and printed upon with inks and other marking substances, said inks and marking substances having high adhesion to the present material. According to the invention, the particular mixture of high and low density polyethylene is extruded from a melt into a flat sheet having a thickness of between 18 and 25 thousandths of an inch. The sheet stock material thus formed has a relatively dull side and a relatively light-reflective side, the materials being typically embossed on the light-reflective side. The relatively dull side of the present sheet stock material is usually the side chosen for printing thereon, printing ink typically being more difficult to remove such as by rubbing from the relatively dull side than from the relatively light-reflective side. The sheet stock material can also be corona-treated in order to facilitate bonding of ink materials thereto.

A melt from which the present stock material can be extruded is typically formed of high density linear polyethylene powder of a mesh particle size which facilitates melting thereof and a melt index typically between 6 to 18. Such a material is commercially available from the U.S. Industrial Chemicals Company under the designation ML-713 and MA-778 and from the Phillips Petroleum Company under the designation BMN TR-980. Low density linear polyethylene in powder form is also preferably used to form a melt from which the present sheet stock material is extruded, the low density polyethylene powder typically being of a mesh particle size similar to that of the high density polyethylene and having a melt index of between 16 and 25. Such a material is commercially available from the U.S. Industrial Chemicals Company under the designation MC-91007 and 711-942 and from Union Carbide Corporation under the designation DNPA 0408. Blending of the dry materials from which the melt is formed can be accomplished manually or through the use of a rotating drum-type blender or other dry powder blender. Such blenders are well known in the art and include the rotating drum blenders commercially available from the Paterson-Kelly Company. The blended high density and low density polyethylene materials are formed into a melt and extruded therefrom in a well-known manner substantially identical to that employed in the formation of sheet stock material comprised of either high density or low density polyethylene alone. The temperature of the melt is maintained at a temperature sufficient to bring both the low density and high density polyethylene into a fluent form, a typical temperature range being from 400 to 500 degrees F.

After extrusion of the present sheet stock material from the melt to form a flat sheet-like material, the sheet material can be corona-treated and embossed on the relatively light-reflective side thereof to enable more convenient printing on the surfaces of the sheet material. Printing of the sheet material is preferably accomplished on the relatively dull side of the sheet material. After printing, the sheet material can be die cut into a plurality of printed articles, the articles particularly comprising key tags and window stickers which have a desired degree of flexibility and tensile strength.

The foregoing is considered as illustrative only of the principles of the invention. Further, since numerous modifications and changes will readily occur to those skilled in the art, it is not desired to limit the invention as exact exactly described, and accordingly all suitable modifications and equivalents may be resorted to, falling within the scope of the invention.

What is claimed as new is as follows:

1. A substantially flat sheet stock material for the manufacture of key tags having an aperture formable in the sheet stock material portion of the key tag, together with a metal ring fittable through the aperture, the material having a thickness of about 0.018 inch to about 0.025 inch and being formable from a melt consisting essentially of a fused blend of:
    (a) approximately 3 parts by volume of powdered high density polyethylene with a molecular weight of at least about 6,000, a melt index of about 6 to about 18, a tensile strength of about 4,000 psi and an impact strength of about 8 Ft-lb/in/notch; and
    (b) one part by volume of powdered low density polyethylene with a molecular weight of at least about 6,000, a melt index of about 16 to 25, a tensile strength of about 1500 psi, and an impact strength of about 10 Ft-lb/in/notch;
    the powdered high and low density polyethylenes forming the melt being powders of a mesh particle size which facilitates melting thereof at a temperature of about 400° F. to about 500° F., the melt being extrudable to form the substantially flat material with a relatively dull side and a relatively light-reflective side, the relatively dull side being characterized by a high degree of adhesion of printing inks or other marking substances, the material being die cuttable and having sufficient tear resistance to prevent pulling of the metal ring through the material during use of the key tag, the material further having sufficient flexibility to impart to the key tag resistance to cracking.

2. A key tag made from the sheet stock material of claim 1, the key tag having an aperture formed therein by die cutting and a metal ring fittable through the aperture.

3. A substantially flat sheet stock material for the manufacture of window stickers formable by die cutting of the flat sheet stock material, the material having a thickness of about 0.018 inch to about 0.025 inch and being formable from a melt consisting essentially of a fused blend of:
 (a) approximately 3 parts by volume of powdered high density polyethylene with a molecular weight of at least about 6,000, a melt index of about 6 to about 18, a tensile strength of about 4,000 psi and an impact strength of about 8 Ft-lb/in/notch; and
 (b) one part by volume of powdered low density polyethylene with a molecular weight of at least about 6,000, a melt index of about 16 to 25, a tensile strength of about 1500 psi, and an impact strength of about 10 Ft-lb/in/notch;
 the powdered high and low density polyethylenes forming the melt being powders of a mesh particle size which facilitates melting thereof at a temperature of about 400° F. to about 500° F., the melt being extrudable into said substantially flat material having a relatively dull side and a relatively light reflective side, the relatively dull side being characterized by a high degree of adhesion of printing inks or other marking substances, the material having a high degree of adherability to a window and being free from curling away from the window when subjected to heat, the material further having sufficient flexibility to lie flat against the window.

4. A window sticker made from the sheet stock material of claim 3.

* * * * *